United States Patent [19]
Oda et al.

[11] Patent Number: 6,088,040
[45] Date of Patent: Jul. 11, 2000

[54] METHOD AND APPARATUS OF FACIAL IMAGE CONVERSION BY INTERPOLATION/EXTRAPOLATION FOR PLURALITY OF FACIAL EXPRESSION COMPONENTS REPRESENTING FACIAL IMAGE

[75] Inventors: Masaomi Oda, Kyoto; Naiwala Pathirannehelage Chandrasiri, Aichi, both of Japan

[73] Assignee: ATR Human Information Processing Research Laboratories, Kyoto, Japan

[21] Appl. No.: 08/917,926

[22] Filed: Aug. 27, 1997

[30] Foreign Application Priority Data

Sep. 17, 1996 [JP] Japan ................................. 8-267827

[51] Int. Cl.$^7$ ................................................. G06T 9/00
[52] U.S. Cl. ........................ 345/435; 345/441; 345/473; 382/118; 382/224
[58] Field of Search .................................. 345/441, 435, 345/473, 425; 382/118, 224

[56] References Cited

U.S. PATENT DOCUMENTS

| | | | |
|---|---|---|---|
| 5,642,431 | 6/1997 | Poggio et al. | 382/118 |
| 5,680,531 | 10/1997 | Litwinowicz et al. | 345/473 |
| 5,719,951 | 2/1998 | Shackleton et al. | 382/118 |
| 5,802,208 | 9/1998 | Podilchuk et al. | 382/224 |

*Primary Examiner*—Mark K. Zimmerman
*Assistant Examiner*—Kimbinh T. Nguyen
*Attorney, Agent, or Firm*—McDermott, Will & Emery

[57] ABSTRACT

An input/output control mechanism receives facial image information of different facial expressions of a plurality of human beings to provide control so that a normalization processing mechanism normalizes each facial image information. A facial expression generation mechanism converts the normalized facial image information into facial expression components, and averages the facial expression components for each facial expression to store the same as average facial expression components. The input/output control mechanism has the facial expression component converted by the facial expression generation mechanism after the applied facial image information is normalized. The facial expression generation mechanism converts the facial expression components of the applied facial image information according to a difference between an average facial expression component corresponding to a facial expression of applied facial image information and an average facial expression component of a specified facial expression. Synthesized facial image information is generated from the converted synthesized facial expression component.

15 Claims, 11 Drawing Sheets

METHOD AND APPARATUS OF FACIAL IMAGE CONVERSION BY INTERPOLATION/EXTRAPOLATION FOR PLURALITY OF FACIAL EXPRESSION COMPONENTS REPRESENTING FACIAL IMAGE

BACKGROUND OF THE INVENTION

1. Field of the Invention

The present invention relates to a facial image information conversion method and facial image information conversion apparatus for generating facial image information with a specified facial expression on the basis of facial image information taken with respect to a certain person.

2. Description of the Background Art

It is said that facial expression which is one information of emotion has a great role in transmitting information in the communication between human beings. It is therefore important to carry out analysis and composition of a facial expression of a person in information transmission such as a teleconferencing system and the like.

In a conventional facial expression generation technique, a three-dimensional configuration model is generated. The configuration is deformed to the configuration of a desired facial expression using a FACS (Facial Action Coding System) model. Then, a picture of a face obtained by a three-dimensional scanner is pasted on the wire frame model in compliance with the deformation to generate a facial expression. A computer of high performance dedicated to image processing is required in order to generate and deform a three-dimensional configuration model. Also, a three-dimensional scanner device is required to generate a facial expression. Furthermore, knowledge of a high level is required to develop an appropriate program. It was not easy to implement such a system. There was also a disadvantage in that the generated facial expression lacks realistic reproduction of wrinkles in the face in accordance with change in the facial expression.

In order to overcome such problems, there is an approach of realizing a desired facial expression by replacing characteristic portions of a face such as the mouth and eyes with the characteristic portions of another person with a desired facial expression. However, this approach has the disadvantage that it is difficult to recognize that the facial expression belongs to a certain person when the constituent portion of the face that are not those of the person himself/herself increases.

There is also a method of realizing a desired facial expression by deforming and replacing such characteristic portions with those of-a desired facial expression of the same person. However, there was a problem that the facial expression is not natural since the entire face is not deformed in this method.

SUMMARY OF THE INVENTION

In view of the foregoing, an object of the present invention is to provide a method and apparatus of facial image information conversion for generating facial image information corresponding to a predetermined facial expression with a simple structure on the basis of facial image information that is picked up.

Another object of the present invention is to provide a method and apparatus of facial image information conversion that allows generation of facial image information that is natural for a person even when facial image information corresponding to a predetermined facial expression is generated on the basis of a predetermined facial image information that is picked up.

According to an aspect of the present invention, an image information conversion method of the present invention includes the steps of: extracting a plurality of facial expression components for each facial expression corresponding to respective projective components for a plurality of coordinate axes on facial image representation space with the entire face taken as processing unit from facial image information of a plurality of different facial expressions of a predetermined human being; calculating a plurality of synthesized facial expression components corresponding to facial image information of a synthesized facial expression of an arbitrary rate for two specified arbitrary different facial expressions by interpolation/extrapolation of facial expression components corresponding to two different facial expressions; and generating synthesized facial image information according to the plurality of synthesized facial expression components.

According to another aspect of the present invention, an image information conversion method includes the steps of: providing an average facial expression component difference between each facial expression by an average operation of a plurality of human beings according to facial expression components extracted from facial image information of a plurality of different facial expressions; deforming an arbitrarily applied facial image information so that a plurality of reference points establish a predetermined position relationship with the entire face taken as a processing unit and converting the same into normalization facial image information; extracting a plurality of facial expression components corresponding to respective projective components for a plurality of coordinate axes on facial image representation space of normalization facial image information; calculating a plurality of synthesized facial expression components corresponding to a specified facial expression representation rate on the basis of an average facial expression component difference between each facial expression and a facial expression component corresponding to the applied facial image information according to a facial expression of the applied facial image information and a specified facial expression; generating normalization synthesized facial image information according to a plurality of synthesized facial expression components; and effecting deformation so that arrangement of reference points of normalization synthesized facial image information is identical to the arrangement of reference points for originally applied facial image information.

According to a further aspect of the present invention, an image information conversion apparatus includes a facial expression component extraction unit, a facial expression component calculation unit, and a synthesized facial image generation unit.

The facial expression component extraction unit extracts a plurality of facial expression components for each facial expression corresponding to respective projective components for a plurality of coordinate axes on facial image representation space with the entire face taken as a processing unit from facial image information of a plurality of different facial expressions of a predetermined human being.

The facial expression component calculation unit calculates a plurality of synthesized facial expression components corresponding to facial image information of a synthesized facial expression of an arbitrary rate for two specified arbitrary different facial expressions by interpolation/extrapolation of facial expression components corresponding to two different facial expressions.

The synthesized facial image generation unit generates synthesized facial image information according to a plurality of synthesized facial expression components.

According to still another aspect of the present invention, an image information conversion apparatus includes a storage unit, a normalization conversion unit, a facial expression component extraction unit, a facial expression component calculation unit, a synthesized facial image normalization unit, and a synthesized facial image generation unit.

The storage unit stores an average facial expression component difference between each facial expression provided by an average operation for a plurality of human beings on the basis of facial expression components extracted from facial image information of a plurality of different facial expressions.

The normalization conversion unit deforms an arbitrarily applied facial image information so that a plurality of reference points establish a predetermined position relationship with the entire face taken as a processing unit, and converting the same into normalization facial image information.

The facial expression component extraction unit extracts a plurality of facial expression components corresponding to respective projective components for a plurality of coordinate axes on facial image representation space of normalization facial image information.

The facial expression component calculation unit calculates a plurality of synthesized facial expression components corresponding to a specified facial expression representation rate from an average facial expression component difference between each facial expression and a facial expression component corresponding to the applied facial image information according to a facial expression of the applied facial image information and a specified facial expression.

The synthesized facial image normalization unit generates normalization synthesized facial image information according to a plurality of synthesized facial expression components.

The synthesized facial image generation unit provides deformation so that arrangement of reference points of normalization synthesized facial image information is identical to the arrangement of reference points for originally applied facial image information.

Therefore, a main advantage of the present invention is that another facial expression of a person of interest can be synthesized from applied person's facial image information.

Another advantage of the present invention is that the processing speed can be improved since a three-dimensional model and the like are not used, and that facial image information of a predetermined facial expression can be generated with a simple structure without usage of a particular apparatus such as an image processing-dedicated machine or a three-dimensional scanner.

A further advantage of the present invention is that, since facial image information is converted with the entire face as the object of processing, the facial image after conversion is deformed naturally as a facial expression of a relevant person.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 12A and 12B are photographic pictures showing the facial expression generation results, wherein FIG. 12A shows a face with no facial expression, and FIG. 12B shows a face with a smile obtained by synthesization.

DESCRIPTION OF THE PREFERRED EMBODIMENTS

First Embodiment

The present invention effects facial expression generation without using a three-dimensional configuration model for the purpose of generating facial image information corresponding to a predetermined facial expression with a simple structure.

Figure 1:
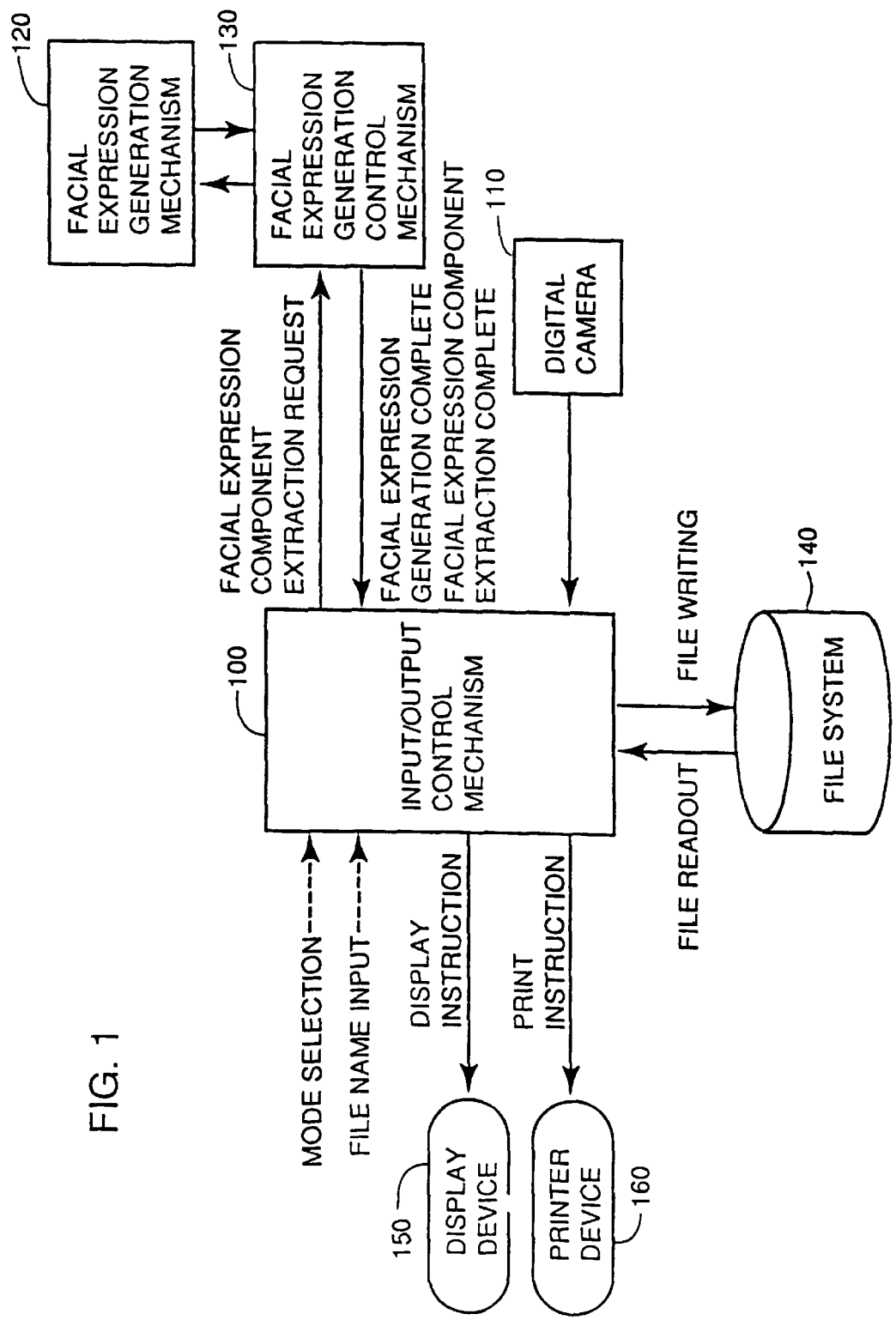
FIG. 1 is a schematic block diagram showing a structure of a facial image information conversion apparatus 1000 according to a first embodiment of the present invention.

FIG. 1 is a schematic block diagram showing a structure of facial image information conversion apparatus 1000 according to a first embodiment of the present invention.

Facial image information conversion apparatus 1000 includes an input/output control mechanism 100 receiving facial image information input from an image-sensing device such as a digital camera 110 for providing control of the operation of peripheral devices according to a mode select signal and the like input from a data input device such as a keyboard (not shown) and the like, a file system 140 under control of input/output control mechanism 100 for storing and holding facial image information, a facial expression generation control mechanism 130 under control of input/output control mechanism 100, responsive to a mode select signal and a file name input by a data input device such as a keyboard (not shown) for controlling a facial expression component extraction operation for facial image information corresponding to a specified file name, or a facial expression generation operation corresponding to an facial expression intermediate two facial expressions corresponding to facial image information specified by two arbitrary file names or corresponding to an emphasized facial expression, a facial expression generation mechanism 120 under control of facial expression generation control mechanism 130 for extracting and storing a facial expression component that will be described afterwards from specified facial image information, or for generating a synthesized facial expression component corresponding to a synthesized facial expression, a display device 150 under control of input/output control mechanism 100 for providing display of specified image information, and a printer device 160 under control of input/output control mechanism 100 for printing out specified image information and text information.

The operation of facial image information conversion apparatus 1000 will be described hereinafter.

Figure 2:
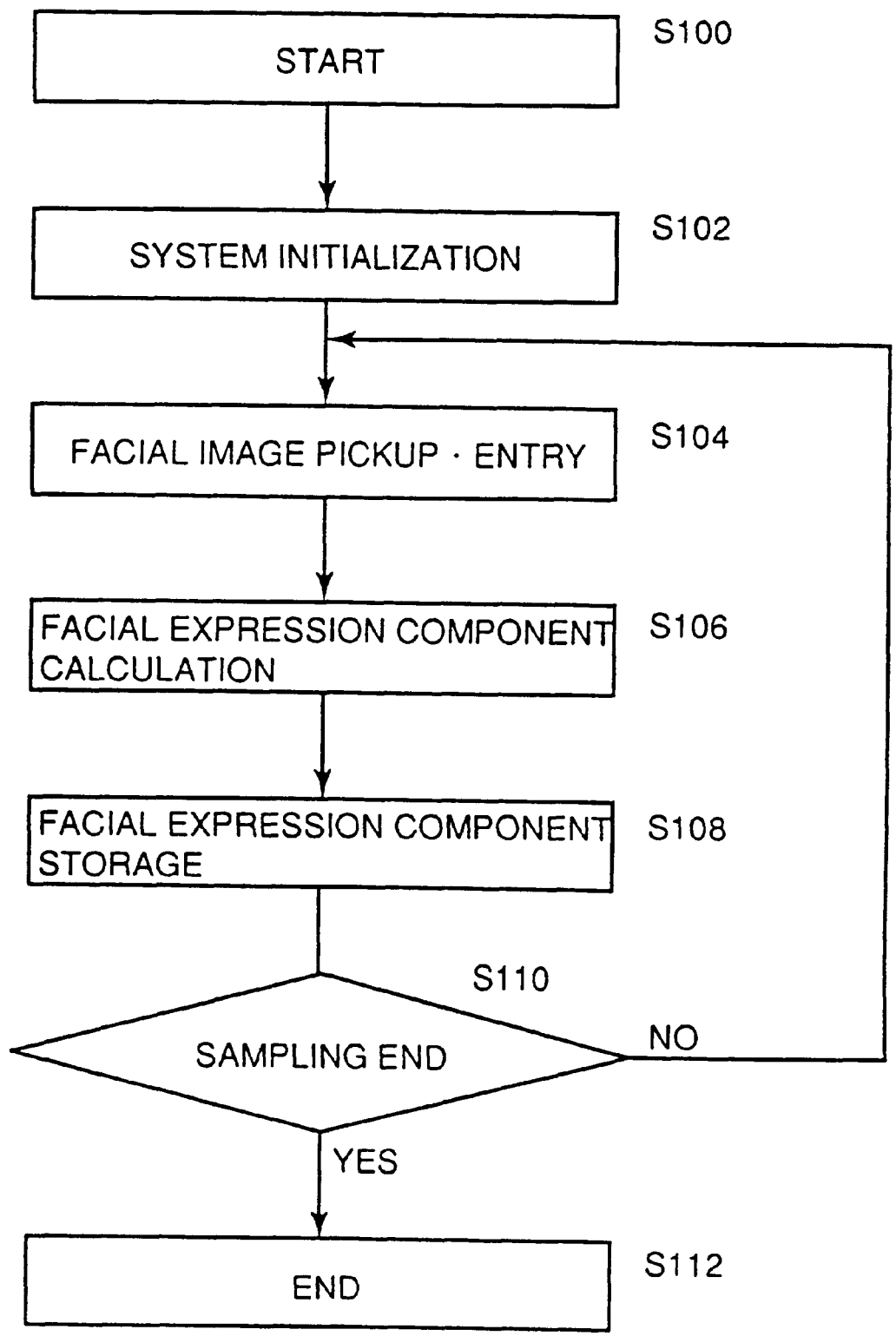
FIG. 2 is a chart of a facial expression component extraction flow of facial image information conversion apparatus 1000.

FIG. 2 is a flow chart for describing an operation in a sampling mode for storing a plurality of facial image information for file system 140.

Input/output control mechanism 100 responds to an externally applied signal to detect specification of a sampling mode to initiate the sampling mode operation (step S100).

In response, input/output control mechanism 100 effects the required system initialization such as switching the display screen of display device 150 and initializing the operation of display generation control mechanism 130 (step S102).

Input/output control mechanism 100 takes the facial image information provided from digital camera 110 to store the information in file system 140 together with a specified file name.

Then, in order to extract facial expression components from the input facial image information, input/output control mechanism 100 provides the facial image information in file system 140 to facial expression generation control mechanism 130 and outputs a facial expression component extraction request signal.

In response, facial expression generation control mechanism 130 provides control so that facial expression generation mechanism 120 carries out facial expression component extraction computation from the specified facial image information (step S100).

When the extraction operation of the facial expression component ends, facial expression generation mechanism 120 stores and maintains the extraction together with the file name. Facial expression generation control mechanism 130 provides a facial expression component extraction complete signal to input/output control mechanism 100 (step S108).

Then, input/output control mechanism 100 responds to an external control signal to determine whether the sampling operation ends or not. When the sampling operation is not yet completed, control returns to the process of image-sensing and taking in a facial image (step S104).

When the end of a sampling operation is specified, the sampling mode ends (step S112).

Facial expression generation mechanism 120 may have a structure including a custom LSI and the like for carrying out, for example, a facial expression component extraction operation depending upon the method of extracting a facial expression component that will be described afterwards to allow facial expression component extraction at high speed.

[Facial Expression Component Extraction Process]

A method of extracting a facial expression component from facial image information will be described hereinafter.

In the following, a facial expression component extraction method employing discrete cosine transform (DCT) will be described. However, the present invention is not limited to this conversion method, and is applicable to any general conversion that allows image information to be represented as a plurality of components.

The case of extracting a facial expression component from information of a black and white image represented in 256 gray scale levels of 128×128 pixels for facial image information will be considered hereinafter as a specific example.

The facial expressions to be processed include a face in a normal state (referred to as "neutral" hereinafter), a smiling face (referred to as "smile" hereinafter), and an angry face (referred to as "anger" hereinafter).

The facial image information is taken as a one-dimensional vector formed of one-dimensional data of $2^{14}$ (128×128) points, converted to a frequency domain using DCT. More specifically, two-dimensional image data is first subjected to horizontal scanning to be converted into one-dimensional data. Then, this one-dimensional data is subjected to discrete cosine transform to obtain the DCT coefficient for each facial expression.

The DCT coefficient for a face of neutral is Xneu(k), the DCT coefficient for a face of smile is Xsmile(k), and the DCT coefficient for a face of anger is Xanger(k) hereinafter. Furthermore, the DCT coefficient for a face of smile and anger is generically represented as Xexp(k) where k indicates the component number in the case of DCT.

By the above procedure, the two-dimensional facial image information of a human being can be represented by a finite number of DCT coefficients.

[Synthesization of Facial Image Information]

The procedure of synthesizing facial image information having an intermediate facial expression between two specified facial expressions or an emphasized facial expression using the DCT coefficients of facial image information corresponding to each facial expression will be described hereinafter.

Figure 3:
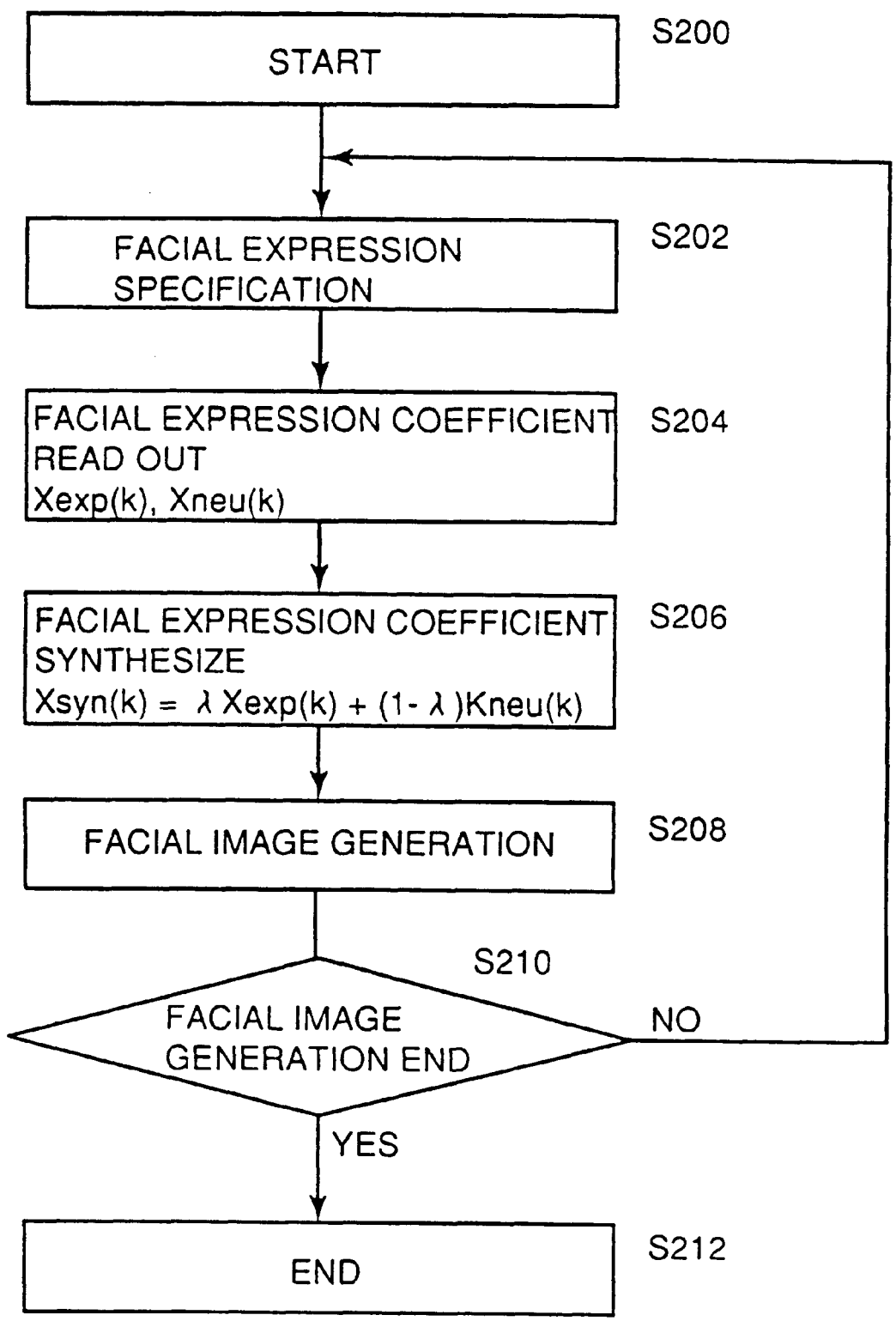
FIG. 3 is a chart of a facial expression coefficient synthesization flow of facial image information conversion apparatus 1000.

FIG. 3 is a flow chart of a synthesization process of facial image information.

Input/output control mechanism 100 initiates a facial image generation mode operation when facial image synthesization is specified by an externally applied instruction (step S200).

Two arbitrary facial expressions are specified by externally applied file names (step S202).

Under control of input/output control mechanism 100, facial expression generation mechanism 120 reads out a facial expression coefficient of the facial image information corresponding to a specified facial expression (step S204).

Here, it is assumed that the read out facial expression coefficients are facial expression coefficient Xexp(k) corresponding to a predetermined facial expression and a facial expression coefficient Xneu(k) for a face of neutral.

Input/output control mechanism 100 provides the read out facial expression coefficient to facial expression generation control mechanism 130, and outputs a facial expression generation request signal. In response, facial expression control mechanism 130 provides control so that facial expression generation mechanism 120 calculates a DCT coefficient Xsyn(k) corresponding to a synthesized facial expression according to the following equation.

$$Xsyn(k)=\lambda Xexp(k)+(1-\lambda)Xneu(k)$$

where $\lambda$ is a parameter to represent the facial expression change with respect to a neutral face. More specifically, when $\lambda=0$, the synthesized facial expression coefficient is equal to DCT coefficient Xneu(k) for a neutral face. When $\lambda=1$, the synthesized facial expression coefficient is equal to DCT coefficient Xexp(k) of a corresponding facial expression.

Thus, when $0<\lambda<1$, an intermediate facial expression, i.e. an interpolated facial expression, is synthesized. When $1<\lambda$, an emphasized facial expression, i.e. an extrapolated facial expression, is synthesized.

Then, facial expression generation mechanism 120 applies inverse-DCT on the calculated DCT coefficient Xsyn(k) corresponding to the synthesized facial expression to generate facial image information with respect to the synthesized facial image (step S208).

Input/output control mechanism 100 determines whether the end of the facial image generation mode is externally specified. When an end is not specified, control returns to the process of step S202 of the facial expression specification. When an end is specified, the facial image generation mode is terminated (step S212).

By the above-described transform process for facial expression image information, facial image information corresponding to a facial expression intermediate a plurality of facial expressions on the basis of a plurality of different facial image information of a predetermined human being can be synthesized with a simple structure.

Furthermore, the above process is advantageous in that the synthesized facial image shows an extremely natural facial expression of the person of interest since the entire face is taken as the object of processing.

Second Embodiment

In the previous first embodiment, a method and apparatus of synthesizing facial image information corresponding to a facial expression intermediate two arbitrary facial expressions on the basis of facial image information corresponding to different facial expressions of a predetermined human being was described.

In the present second embodiment, a method and apparatus of displaying a specified facial expression at a specified arbitrary facial expression representation rate, for example, generating facial image information of a smiling face at an arbitrary rate, on the basis of arbitrary facial image information of an arbitrary person will be described.

Facial expression representation rate implies the transformation rate from a facial expression of applied facial image information to a specified facial expression, as will be described afterwards.

Figure 4:
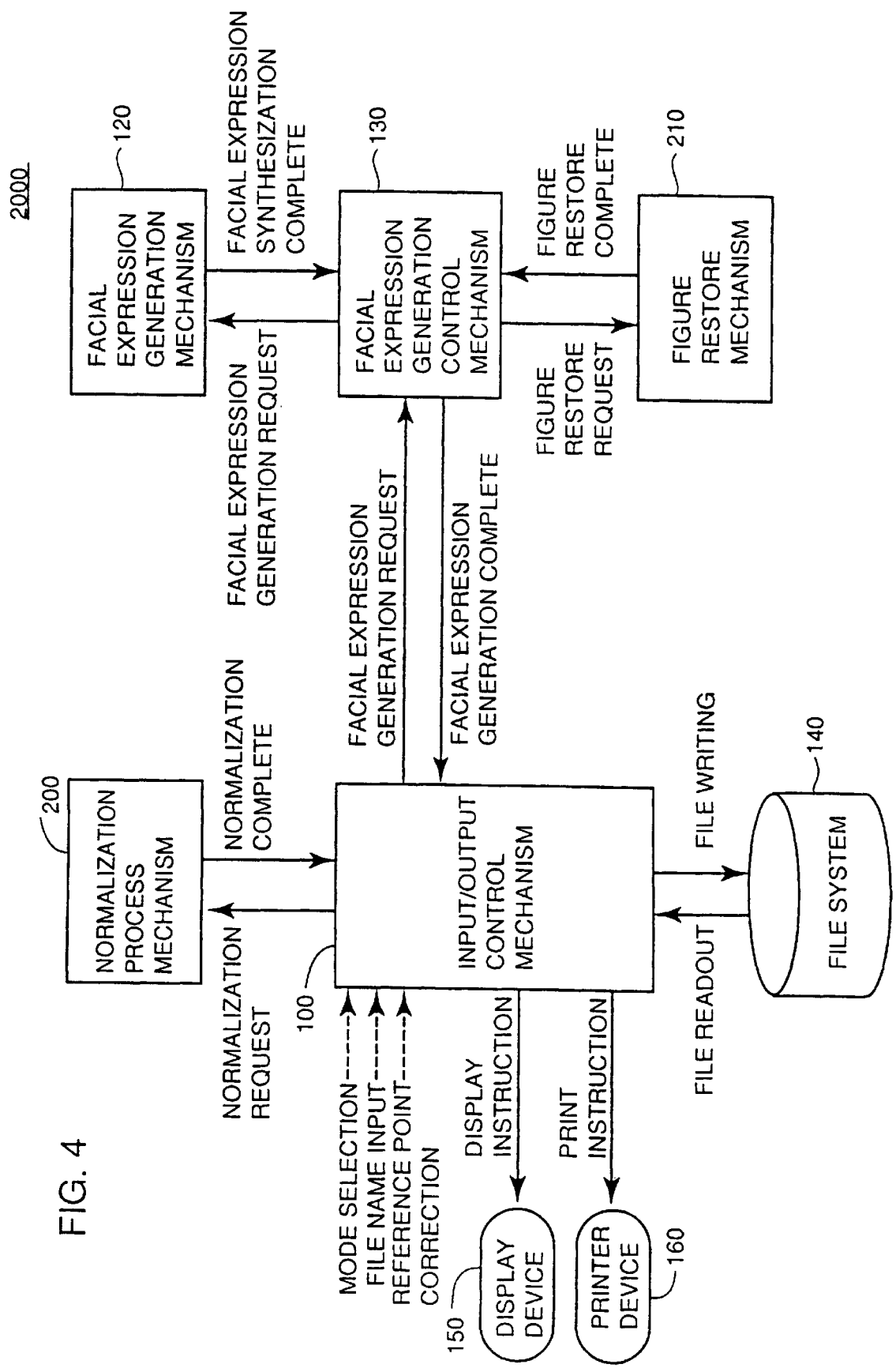
FIG. 4 is a schematic block diagram showing a structure of a facial image information conversion apparatus 2000 according to a second embodiment of the present invention.

FIG. 4 is a schematic block diagram showing a structure of a facial image information conversion apparatus 2000 according to a second embodiment of the present invention.

Facial image information conversion apparatus 2000 of the second embodiment differs in structure from facial image information conversion apparatus 1000 of the first embodiment in including a normalization process mechanism 200 under control of input/output control mechanism 100 to carry out a normalization process of facial image information that will be described afterwards, and a figure restore mechanism 210 under control of facial expression generation control mechanism 130 for restoring the facial image information generated by facial expression generation mechanism 120 to a facial image inherent to the corresponding person.

The remaining like components have the same reference characters allotted, and their description will not be repeated.

The operation of facial image information conversion apparatus 2000 of FIG. 4 will be described hereinafter.

Figure 5:
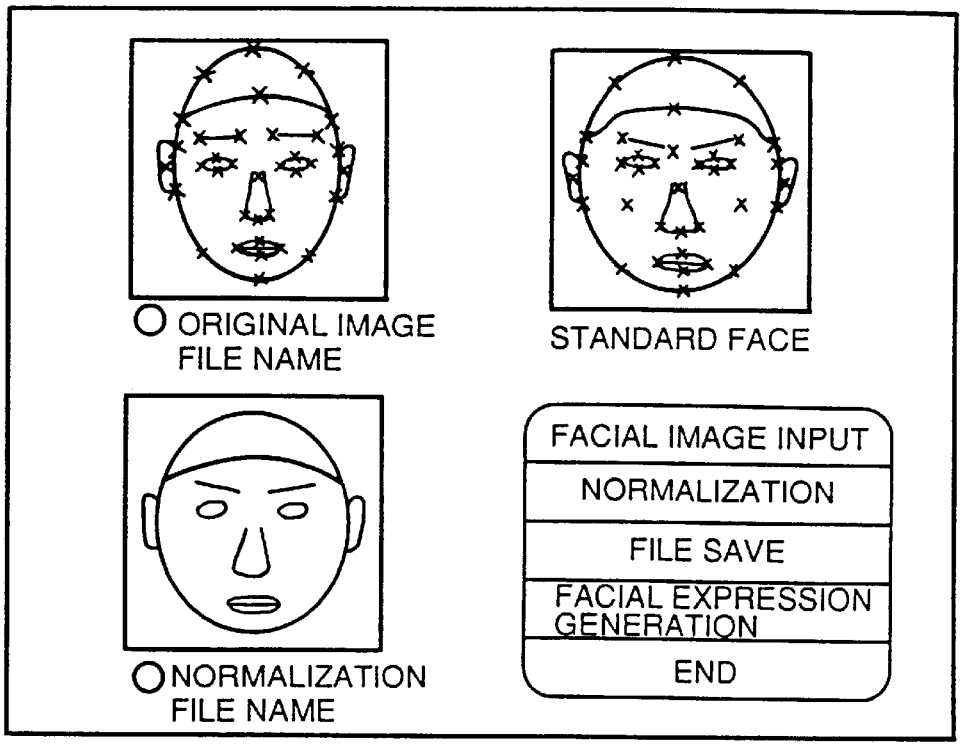
FIGS. 5 and 6 are schematic diagrams showing examples of an interface screen of facial image information conversion apparatus 2000.
Figure 6:
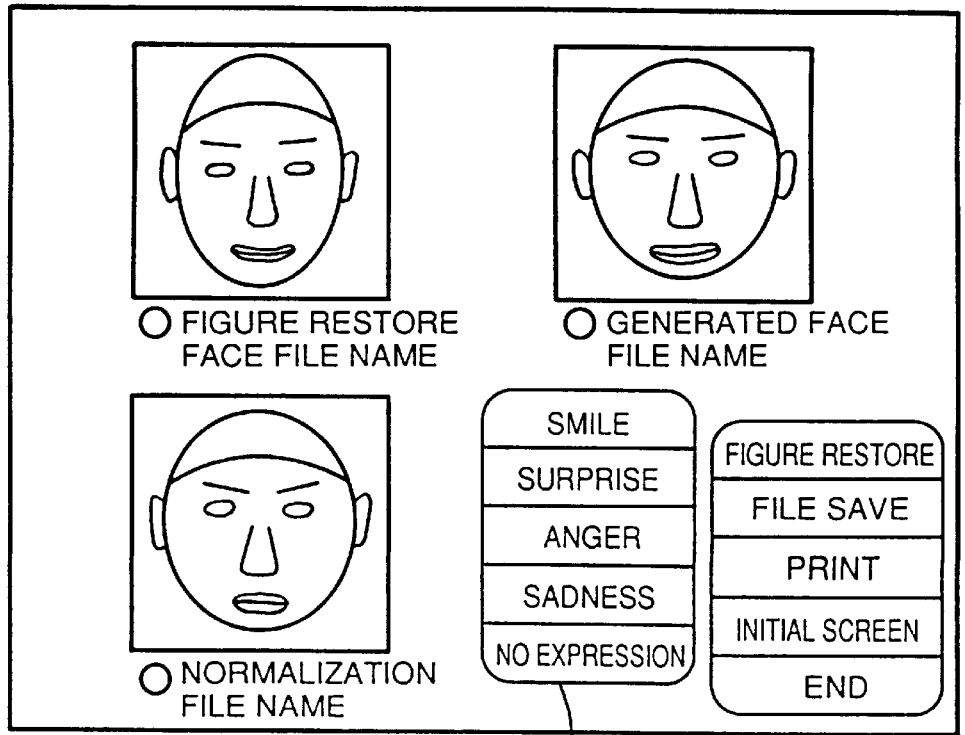

FIGS. 5 and 6 shows the interface of a user and the system in the second embodiment, i.e. an example of a screen displayed on display device 150. FIG. 5 shows a display screen in selecting a corresponding process mode after facial image information is entered.

FIG. 6 shows a display screen when facial image information is to be synthesized according to an instruction from the user.

Referring to FIG. 5, depression of a facial image input button by the user allows a file name of an original image to be input. The user enters an object file name of the file including the facial expression to be operated. Upon input, the contents of the object file (original image) is provided on the display screen. Reference points are displayed on corresponding positions on the original image corresponding to the reference point position of a standard face. Here, reference points include the positions of the medial angle of eye, the lateral angle of eye, the upper lip, the lower lip, the columella, the beginning and ending points of the eyebrow, either side points of the mouth and the like.

The user shifts all the reference point positions on the original image to a corresponding position of the face while referring to the-reference points of the displayed standard face. When the user depresses the normalization button, a normalized facial image is displayed.

Here, a normalized facial image implies the converted facial image information of the original image so that the arrangement of the specified reference points of the original image commensurates with the arrangement of the reference points for the standard face.

Figure 7B:
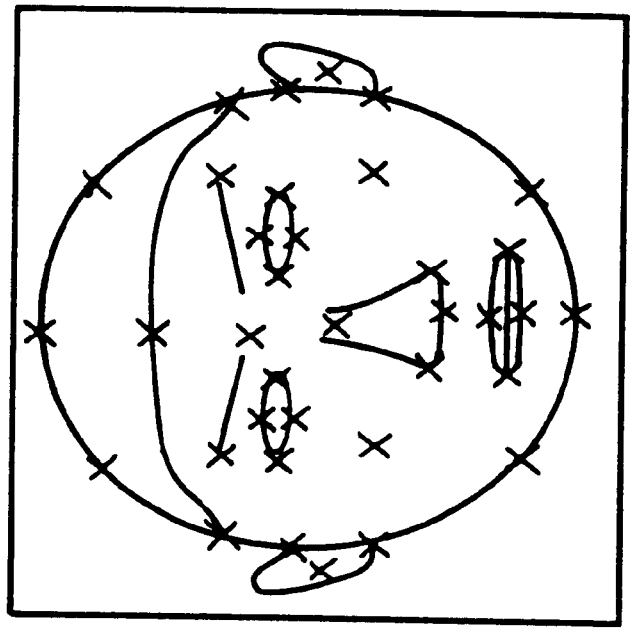
FIGS. 7A and 7B are schematic diagrams for describing a normalization process of facial image information, wherein FIG. 7A indicates an original image, and FIG. 7B indicates an image subjected to a normalization process.
Figure 7A:
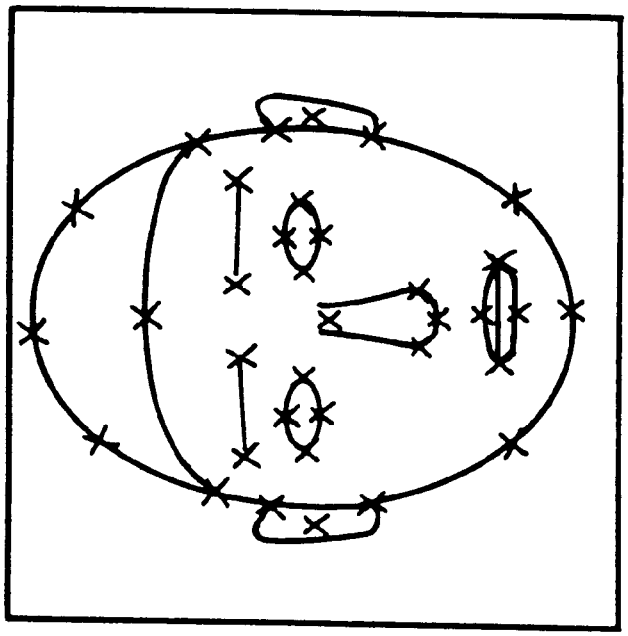

FIGS. 7A and 7B are schematic diagrams for describing the normalization concept. FIG. 7A represents the facial image information of the original image, and FIG. 7B represents the facial image information of a standard face. In general, the position of the eye, nose, mouth, ears and the like differs for each person. It is difficult to extract general characteristics even when image processing is carried out with the intact different arrangements for each person. By specifying reference points for the facial image information on the original image as shown in FIG. 7A, the facial image information of the original image is deformed so that the position of respective reference points match the reference points of the standard face shown in FIG. 7B.

By such deformation, the characteristic change in the image information in accordance with a more general facial expression change can be extracted with the dominance over the arrangement of the-eyes and the nose differing for each person.

Following normalization of the entered facial image information of the original image, the user can depress the file save button to allow input of a normalization file name. The user enters a normalization file name. In response, the normalization facial image information is stored in file system 140. The position information of a reference point on the original image and a reference point on the normalized face is stored in file system 140 as a pair. The user then depresses the facial expression generation button, whereby the process proceeds to the screen of FIG. 6. At this time point, the normalized face and the file name are provided on the display.

The user selects and presses one facial expression from facial expression menu button 300. The facial expression of the normalized face image information is altered to a relevant facial expression, so that synthesized facial image information is provided on the display. The user depresses the figure restore button to generate the facial image information restored to the figure of the original image. The file name of the figure restored face can be entered when the user depresses the file save button. By entering a file name, the facial image information with the figure restored figure is stored in file system 140.

Facial expression generation is continued until the user depresses the initial screen button or the end button. Upon depressing the initial screen button, control returns to the screen of FIG. 5.

The facial expression generation process is terminated when the user depresses the end button on the screen of FIG. 5 or 6.

Figure 8:
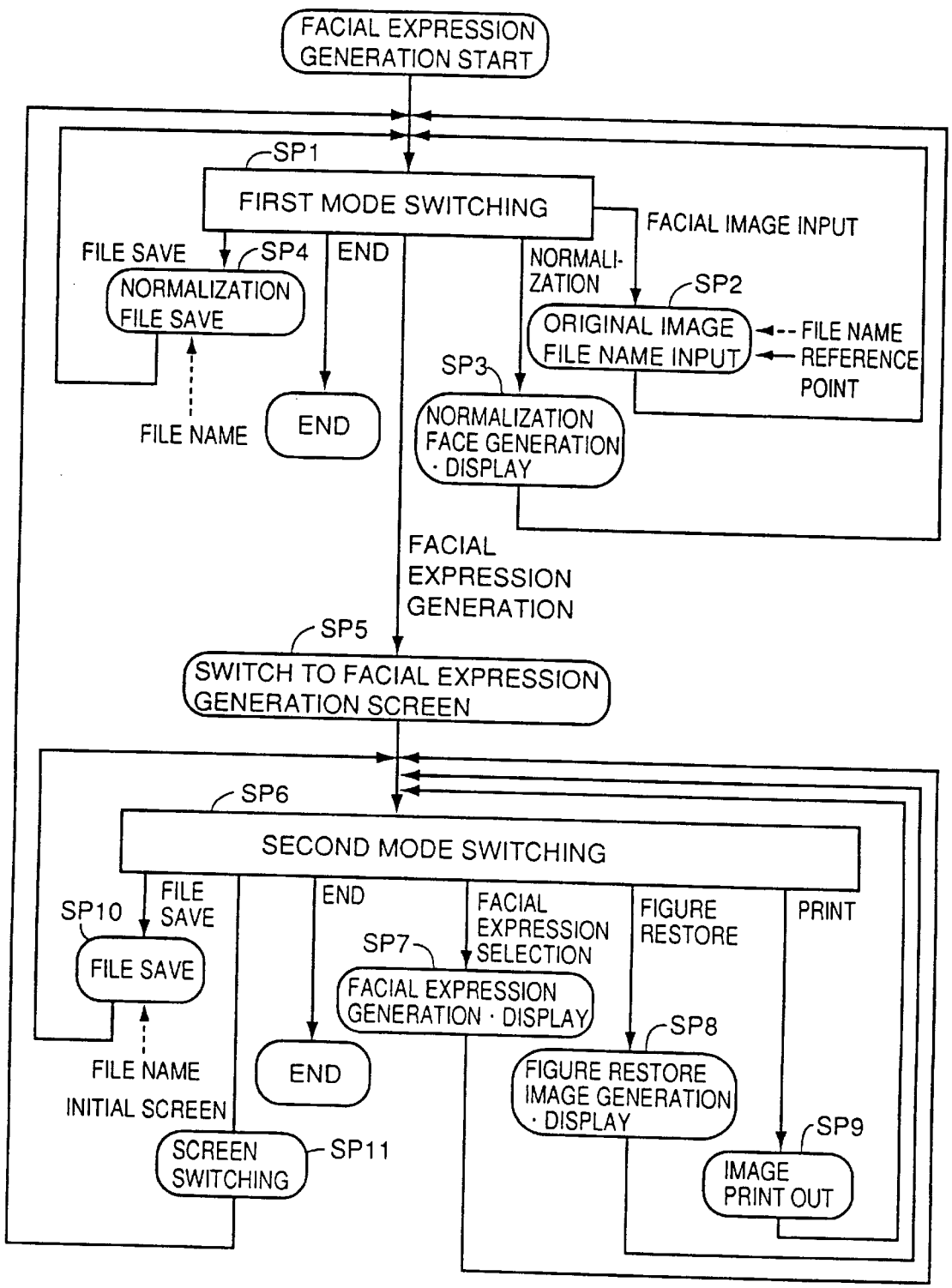
FIG. 8 is a flow chart describing an operation of facial image information conversion apparatus 2000.

FIG. 8 is a flow chart showing a facial expression conversion process of facial image information conversion apparatus 2000 of FIG. 4. In FIG. 8, the screen of FIG. 5 is provided on display device 150 in a first mode switch operation, and the screen of FIG. 6 is provided on display device 150 in a second mode switch operation.

Referring to FIGS. 5, 6 and 8, the user selects a facial image input mode (step SP1). Following entry of a file name (step SP2), input/output control mechanism 100 selects a relevant file from file system 140 to provide the contents thereof to display device 150. The user shifts using a pointing device (not shown) so that the reference points on the original image are located corresponding to the reference points on the standard face of FIG. 5 (step SP2).

When the user depresses the normalization button at step SP1, input/output control mechanism 100 controls facial expression generation control mechanism 130 so as to normalize and provide to display device 150 the facial image information corresponding to the relevant original image (step SP3).

Upon generating normalization facial image information, a normalization file name can be entered. The user inputs a normalization file name. When the user selects the file save button at step SP1, input/output control mechanism 100 saves the normalization file in file system 140 (step SP4).

When the user depresses the facial expression generation button at step SP1, the screen is switched to a facial expression generation screen (step SP5). Accordingly, the screen on display device 150 is switched to the screen of FIG. 6.

When the user selects a predetermined facial expression button and specifies a facial expression representation rate via facial expression select button 300, input/output control mechanism 100 controls facial expression generation control mechanism 130 so as to generate facial image information having a corresponding facial expression and provides the generated information on display device 150 (step SP7).

When the user depresses the figure restore button at step SP6, input/output control mechanism 100 controls facial expression generation control mechanism 130 so that the figure of the generated synthesized facial image information is restored to the figure of the face of the original image on the basis of the reference point position data of the original image. The generated synthesized facial image information is provided on display device 150 (step SP8).

The figure restore mechanism 210 shifts the position of the normalization reference point information provided from facial expression generation control mechanism 130 according to the original reference point information applied to the facial expression information, and corrects the distortion caused by the shifting with the linear interpolation method. Texture information is provided to the shifted position to restore the facial image. The distortion of the texture information in addition to the distortion of the reference point caused by shifting is also corrected by linear interpolation method using the shifted position of the reference point.

When the user depresses the print button at step SP6, the restored synthesized facial image information is printed out by a printer (step SP9).

When the user depresses the file save button at step SP6, a file name can be entered. The user enters a file name (step SP10), whereby input/output control mechanism 100 saves the corresponding synthesized facial image information in file system 140.

When the user depresses the initial screen button at step SP6, input/output control mechanism 100 switches the display screen of display device 150 to that shown in FIG. 5.

The operation of the system is terminated when the user depresses the end button at step SP1 or SP6.

The procedure of synthesizing facial image information of a specified facial expression to an applied arbitrary facial image information according to the operation of facial image information conversion apparatus 2000 will be described hereinafter.

[Average Facial Expression Component Extraction Flow]

Figure 9:
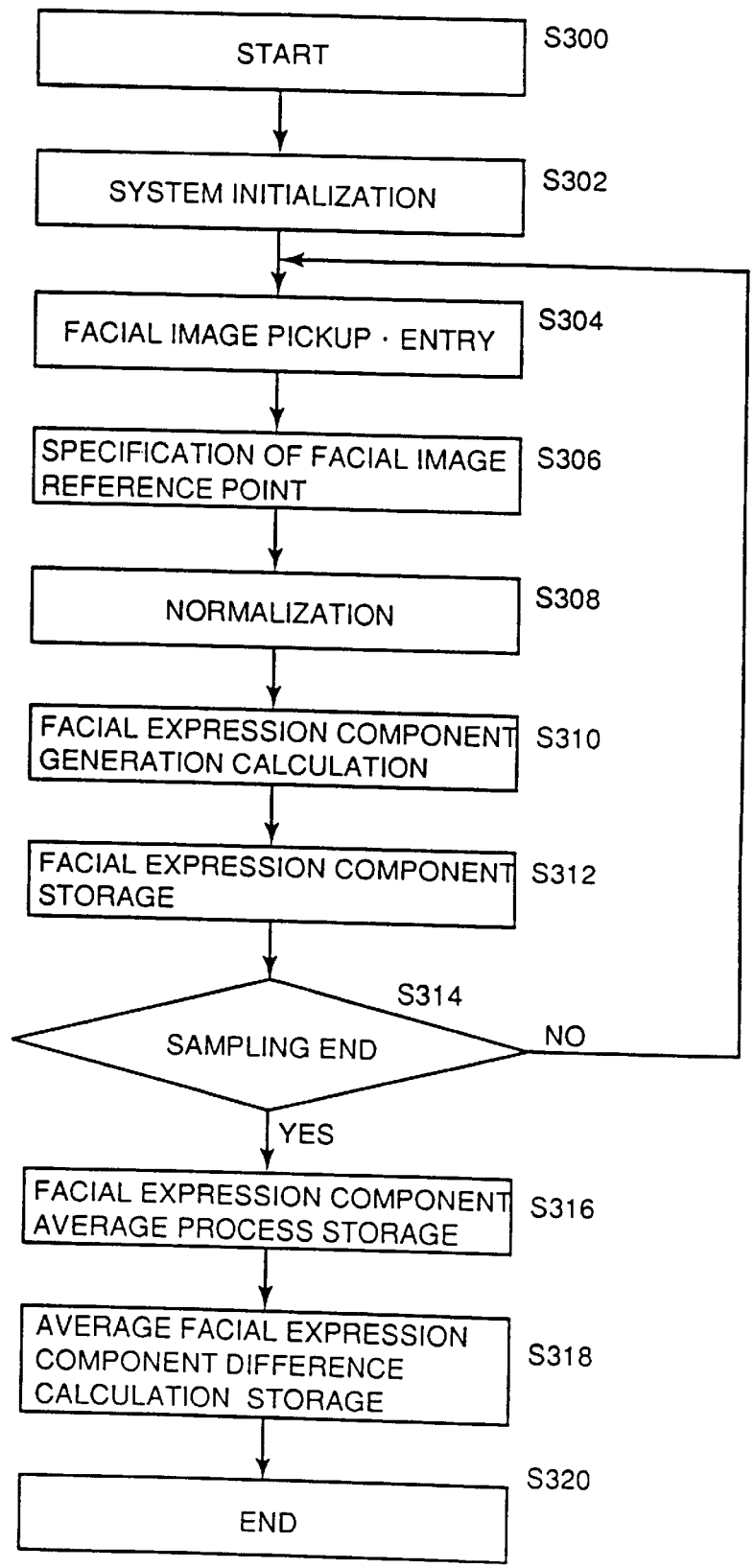
FIG. 9 is a chart of an average facial expression component extraction flow of facial image information conversion apparatus 2000.

FIG. 9 is a flow chart representing the process of extracting facial expression components from different facial image information of a plurality of human beings, and extracting an average facial expression component for each facial expression.

When an average facial expression component extraction flow is initiated (step S300), the system is initialized by input/output control mechanism 100 (step S302).

Facial image information taken by digital camera 100 and the like is entered and stored in file system 140 by input/output control mechanism 100 (step S304).

Then, specification of the reference points of the facial image is carried out (step S306).

Input/output control mechanism 100 provides the input facial image information and position data of the reference points to normalization process mechanism 200. Normalization process mechanism 200 applies a normalization process on the input facial image information (step S308).

Input/output control mechanism 100 provides the normalized facial image information from normalization process mechanism 200 to facial expression generation control mechanism 130. Facial expression generation mechanism 120 carries out computation to extract a facial expression component (facial expression coefficient) with respect to the normalized facial image information (step S310).

Facial expression generation mechanism 120 stores and holds the extracted facial expression component (step S312).

Then, input/output control mechanism 100 monitors depression of a different mode button to determine whether the sampling mode ends or not (step S314). When the sampling mode has not yet ended, control returns to the process of step S304 for picking up and entering facial image information. When the facial expression generation button is depressed, facial expression generation control mechanism 130 provides control so that facial expression generation mechanism 120 carries out an average process of the facial expression component on each input facial image information for every corresponding facial expression. The obtained average facial expression component is stored in facial expression generation mechanism 120 (step S316).

Then, an average facial expression component difference is calculated between each facial expression to be stored in facial expression generation mechanism 120.

Thus, an average facial expression component extraction flow is completed (step S320).

The method of calculating the facial expression component (facial expression coefficient) of FIG. 9 will be described in detail hereinafter.

The method of calculating a facial expression component for facial image information by KL (Karhunen-Loève) expansion will be described in the following.

KL expansion and the previously-described DCT are the so-called orthogonal transformation. The space represented by the coordinate system formed by the basic vector of the orthogonal transformation is referred to as facial image representation space. In other words, a particular facial image is represented as projective components for respective coordinate axes in the facial image representation space.

The present invention is not limited to orthogonal transformation, and is applicable to a general coordinate transform. However, orthogonal transformation is advantageous in that treatment of inverse transform is simplified.

By scanning each facial image information from the top line, a one-dimensional vector Xi with the gray scale value at each position as an element is produced. The average vector M (corresponding to vector representation for an average face) of the one-dimensional vector for all the learning samples is obtained. Then, the following covariance matrix V is obtained.

$$V = \frac{1}{m}\sum_{i=1}^{m}(X_i - M)(X_i - M)^T$$

where m is the number of learning samples.

An eigen value $\lambda_i$ and an eigenvector $e_i$ (i=1, 2, ..., m−1) are obtained according to the following equation from matrix V.

$$V \cdot e_i = \lambda_i \cdot e_i$$

The eigenvector forms the basic vector of the normal orthogonal space. The eigen vectors are arranged in a descending order of the eigen value. Each vector is identified by its sequence order. For example, the nth vector is called the nth principle component. The projective value for an eigen vector is called a coefficient value of the principle component. Information of a corresponding facial image is represented by a set of coefficient values for each principle component.

More specifically, arbitrary facial image information X is represented as follows.

$$Y(j) = e_i^T(X - M)$$
$$Y(y(1), y(2), \ldots, y(m-1))$$

The average value of each principle component for every corresponding facial expression, for example, a face with a smile, is obtained with respect to each facial image information obtained as described above.

A one-dimensional vector with the projective values for all coordinate axes as an element for every facial image information of each person is obtained with respect to facial image information belonging to a certain facial expression. The facial image information corresponding to the one-dimensional vector represented by all values of each coefficient for all the persons picked up by a camera or the like is referred to as average facial image information.

Figure 10:
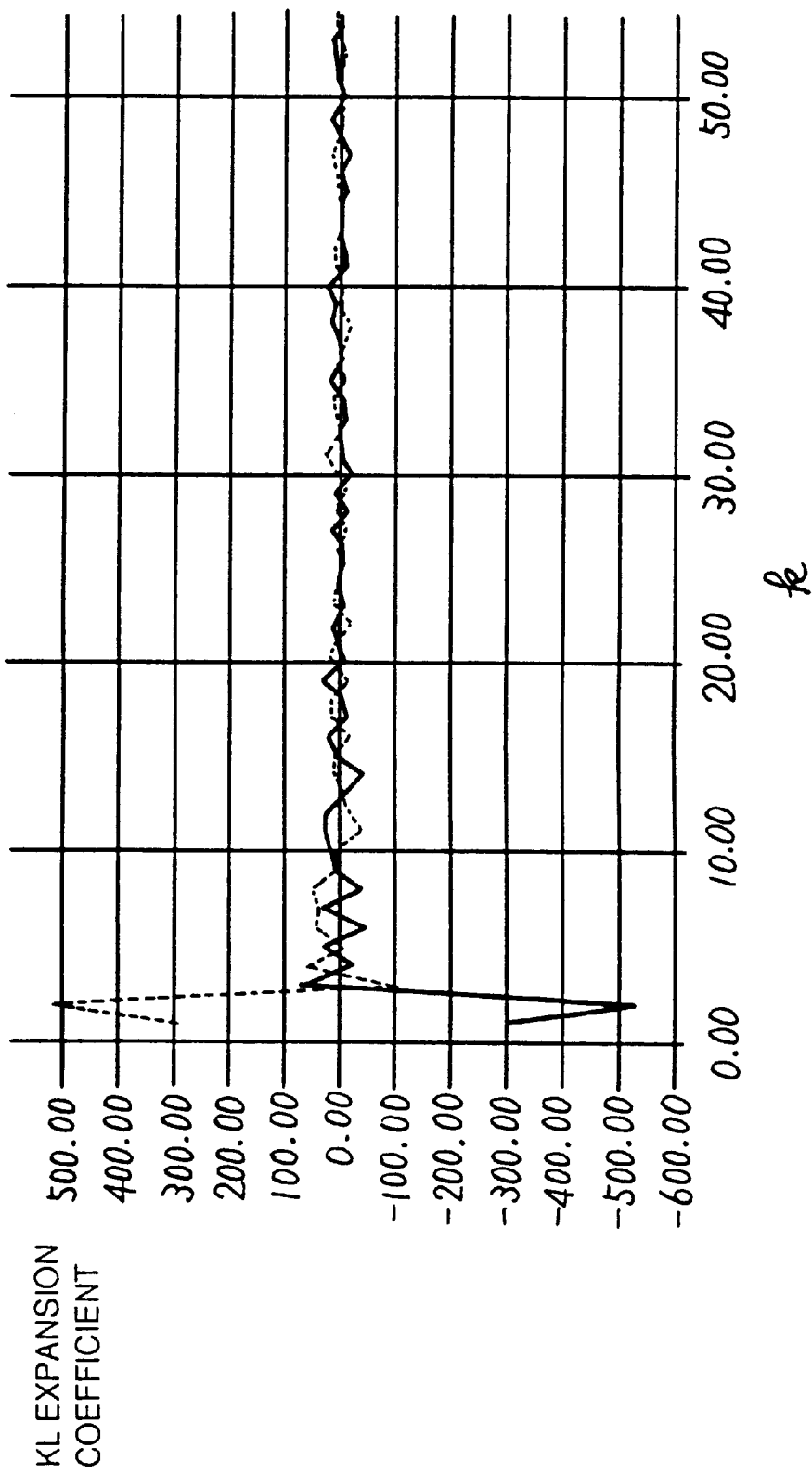
FIG. 10 is a diagram showing a distribution of average facial expression components.

The result of obtaining facial expression components which are the projective values to coordinate axes on facial image representation space with respect to facial image information for a normalized particular facial expression, for example a smile, is shown in FIG. 10.

In this example, representation of a facial image according to 205-dimensional facial image representation space is shown. In FIG. 10, the solid line represents the components distribution for a face of neutral (no facial expression), and the dotted line represents the facial expression components distribution for a face with a smile. FIG. 10 shows only the coefficient values up to the 55th component.

Thus, when facial image information is represented by one-dimensional vectors with the projective values for an eigenvector as an element, each component will show a particular value for a corresponding facial expression.

Then, an average facial expression component is obtained according to the facial expression components corresponding to each facial expression obtained as described above. More specifically, a difference Xe(k) between an average facial expression component Xm2(k) for a face with a smile and an average facial expression component Xm1(k) for an original facial expression 1 is obtained where the face of neutral is facial expression 1 and the face with a smile is facial expression 2. The obtained difference Xe(k) is stored in facial expression generation mechanism 120.

Figure 11:
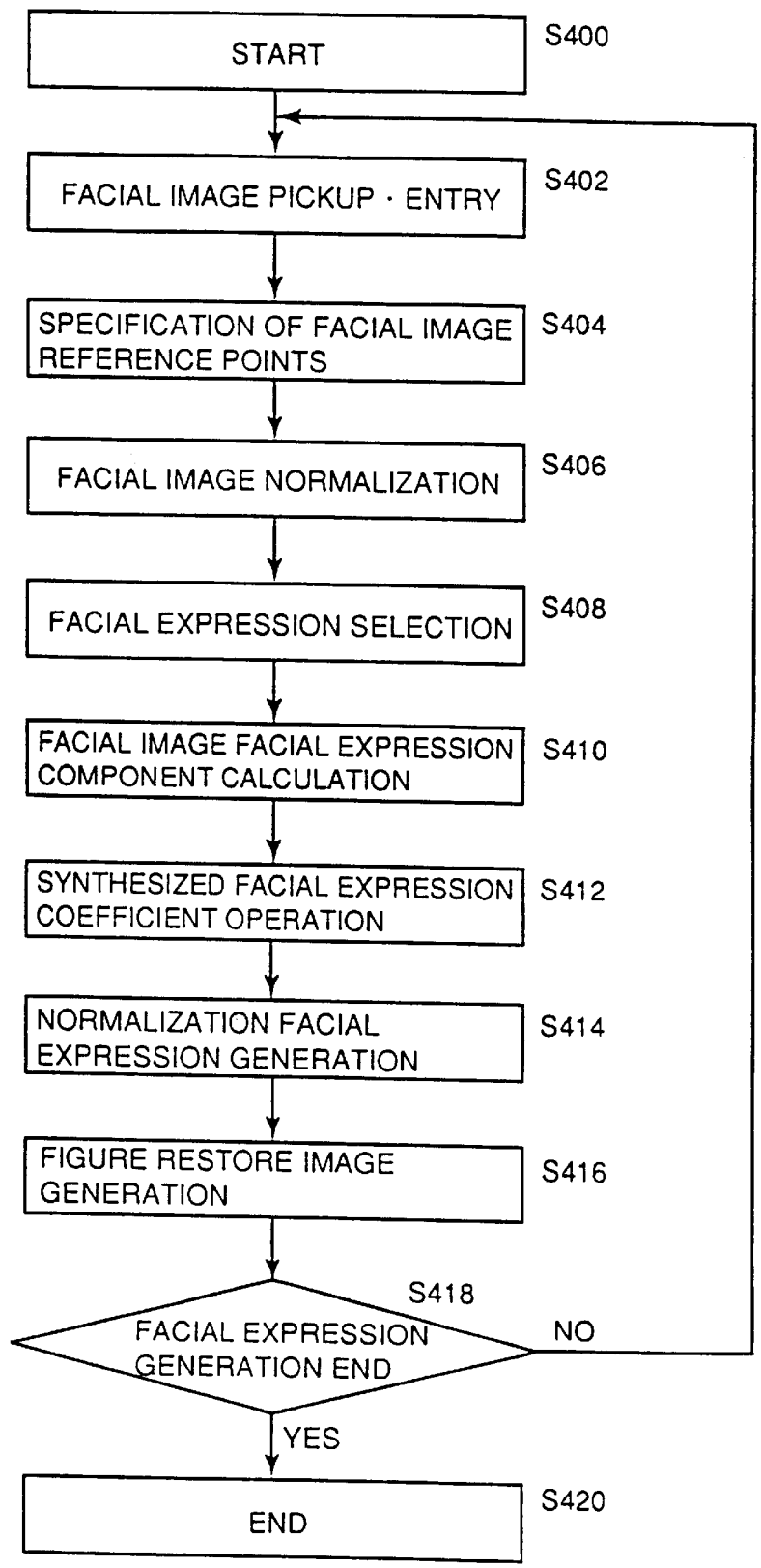
FIG. 11 is a chart of a facial expression generation flow of facial image information conversion apparatus 2000.

The process of synthesizing a facial image of a specified facial expression for an applied arbitrary facial image will be described hereinafter with reference to the flow chart of FIG. 11.

When a facial expression generation flow is initiated (step S400), input/output control mechanism 100 enters facial image information picked up by digital camera 110 or facial image information that is stored in file system 140 according to an externally specified file name (step S402).

Specification of reference points is carried out for the applied facial image information (step S404).

A normalization process of the facial image information is carried out according to the specified reference points (step S406).

When a certain facial expression is selected by the user (step S408), input/output control mechanism 100 controls facial expression generation control mechanism 130 so as to carry out an extraction operation of a facial expression component of the relevant facial image information applied to facial expression generation mechanism 120 (step S410).

Facial expression generation mechanism 120 reads out an average facial expression component difference corresponding to the difference between the selected facial expression and the facial expression of the applied facial image to compute a facial expression coefficient for a synthesized facial expression (step S412).

According to the synthesized facial expression coefficient, facial expression generation mechanism 120 generates a normalized synthesized facial expression (step S414).

Then, figure restore mechanism 210 carries out a figure restore process of the image information corresponding to the generated normalization synthesized facial expression under control of facial expression generation control mechanism 130 (step S416).

The restored synthesized facial image information is output to display device 150.

Input/output control mechanism 100 proceeds to a mode corresponding to the next depressed button. For example, when the initial screen button is depressed (step S418), control returns to the facial image pickup·enter process (step S402). When determination is made that the end button is depressed, input/output control mechanism 100 terminates the system.

The synthesized facial expression coefficient calculation process of FIG. 11 will be described in detail hereinafter.

In the average facial expression component extraction flow of FIG. 9, the difference Xe(k) between an average facial expression component Xm2(k) corresponding to facial expression 2 (a face with a smile) and an average facial expression component Xm1(k) for the original facial expression 1 (face of neutral) is obtained.

In the synthesized facial expression coefficient calculation, the synthesized facial expression component for a corresponding facial expression 2 (a face with a smile) is obtained by the following equation for the facial expression component of the applied facial image information of the original facial expression 1 (face of neutral).

X2syn($k$)=X1($k$)+P·Xe($k$)

where P is the facial expression representation rate applied by the user.

By carrying out inverse transform on the basis of the computed synthesized facial expression component, corresponding normalized synthesized facial image information is generated.

Furthermore, by deforming the synthesized normalization synthesization facial image information so that the arrangement of the reference points thereof matches the arrangement of the reference points of the original facial image information, facial image information of a corresponding facial expression can be obtained.

By calculating X1(k)−Xm1(k) in the above equation, the offset from an average facial expression 1 of a certain person, i.e. the component inherent to that certain person, remains. Although there is a possibility that a portion of facial expression component 1 is included in the remaining component, the generated facial expression 2 will have the facial expression of an average facial expression 2 while maintaining the feature of that certain person if the offset from the average facial expression is small.

Figure 12A:
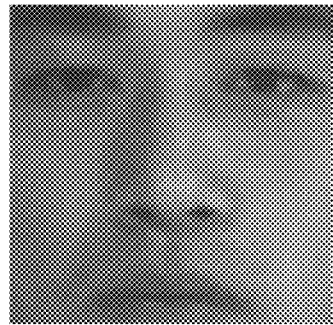
Figure 12B:
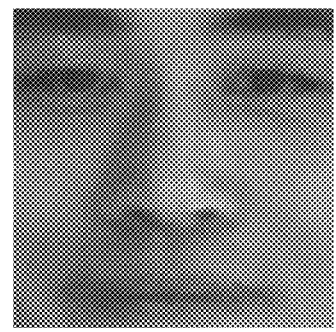

FIGS. 12A and 12B are photographs showing conversion from a neutral face (no facial expression) to a smiling face. FIG. 12A represents facial image information corresponding to a face with no facial expression. FIG. 12B represents facial image information corresponding to a smiling face.

The above-described facial image information transformation can similarly be applied when using DCT as the facial expression component extraction method. In the case of one-dimensional DCT, facial image information is sequentially scanned from the top to accommodate the gray scale value as one-dimensional data for each row, whereby facial image information can be represented as below.

$$X1(k) = (2/N)C(k)\sum_{n=0}^{N-1} X1(n)\cos\{k(n+1/2)(\pi/N)\}$$

$$(k = 0, 1, 2, \ldots, N-1)$$

C($k$)=½($k$=0), C($k$)=1 (K≠0)

where X1l(n) indicates the nth one-dimensional data, and X1(k) represents the projective component (DCT coefficient) to the kth coordinate axis.

By decomposing applied facial image information into a plurality of facial expression components to obtain the difference between facial expressions of average facial expression components for a plurality of human beings in advance with respect to each facial expression component, the applied facial image information can be converted into facial image information of an arbitrary facial expression with a simple structure.

Since conversion of the facial image information is carried out with the entire face as the object of processing, facial image information can be synthesized having a natural change in the facial expression as for the same person.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image information conversion method comprising the steps of:

extracting, from facial image information of a plurality of one-dimensional different facial expressions of a predetermined human being, a plurality of facial expression components for each said facial expression corresponding to respective projective components for a plurality of coordinate axes on facial image representation space taking the entire face as a processing unit, calculating a plurality of synthesized facial components corresponding to facial image information of a synthesized facial expression at an arbitrary rate for specified arbitrary two of said different facial expressions by interpolation/extrapolation of a facial expression component corresponding to said two different facial expressions, and generating synthesized facial image information according to said plurality of synthesized facial expression components.

2. The facial image information conversion method according to claim 1, wherein said facial expression components and said synthesized facial expression components are expansion coefficients of corresponding facial image information expanded by Karhunen-Loève Transform.

3. The facial image information conversion method according to claim 1, wherein said facial expression components and said synthesized facial expression components are expansion coefficients of corresponding facial image information expanded by discrete cosine transform.

4. A facial image information conversion method comprising the steps of:

producing an average facial expression component difference between each facial expression by an average operation for a plurality of human beings according to facial expression components extracted from facial image information of a plurality of different facial expressions, deforming arbitrary applied facial image information so that a plurality of reference points establish a predetermined position relationship with the entire face taken as a processing unit to convert the same into normalization facial image information, extracting a plurality of one-dimensional facial expression components corresponding to respective projective components for a plurality of coordinate axes on facial image representation space of said normalization facial image information, calculating a plurality of synthesized facial expression components corresponding to a specified facial expression representation rate on the basis of an average facial expression component difference between each facial expression and said facial expression component corresponding to said applied facial image information, according to a facial expression of said applied facial image information and a specified facial expression, generating normalization synthesized facial image information according to said plurality of synthesized facial expression components, and deforming said normalization synthesized facial image information so that arrangement of reference points thereof are identical to the arrangement of reference points for original said applied facial image information to generate synthesized facial image information.

5. The facial image information conversion method according to claim 4, wherein said facial expression components and said synthesized facial expression components are expansion coefficients of corresponding facial image information expanded by Karhunen-Loève Transform.

6. The facial image information conversion method according to claim 4, wherein said facial expression components and said synthesized facial expression components are expansion coefficients of corresponding facial image information expanded by discrete cosine transform.

7. A facial image information conversion method comprising the steps of:

specifying a plurality of reference points for each reference face image information with respect to a plurality of reference face image information of a different facial expression for a plurality of human beings, deforming said reference face image information so that said plurality of reference points established a predetermined position relationship with the entire face taken as a processing unit for every said reference face image information and converting the same into normalization reference facial image information, extracting a plurality of one-dimensional facial expression components corresponding to respective projective components for a plurality of coordinate axes on facial image representation space of each said normalization reference facial image information, and obtaining an average facial expression component for each said facial expression component with respect to said plurality of human beings for each facial expression and said average facial expression component difference between facial expressions, specifying a plurality of reference points for arbitrary applied facial image information with the entire face taken as a processing unit, deforming said applied facial image information so that said plurality of reference points establish a predetermined position relationship with the entire face taken as a processing unit, and converting the same into normalization facial image information, extracting a plurality of facial expression components corresponding to respective projective components for a plurality of coordinate axes on image representation space of said normalization facial image information, calculating a plurality of synthesized facial expression components corresponding to a specified facial expression component from said average facial expression component difference and said facial expression component corresponding to said applied facial image information, according to a facial expression of said applied facial image information and a specified facial expression, generating normalization synthesized facial image information according to said plurality of synthesized facial expression components, and deforming said normalization synthesized facial image information so that arrangement of reference points thereof are identical to arrangement of reference points for original said applied facial image information to generate synthesized facial image information.

8. The facial image information conversion method according to claim 7, wherein said facial expression components and said synthesized facial expression components are expansion coefficients of corresponding facial image information expanded by Karhunen-Loève Transform.

9. The facial image information conversion method according to claim 7, wherein said facial expression components and said synthesized facial expression components are expansion coefficients of corresponding facial image information expanded by discrete cosine transform.

10. An image information conversion apparatus comprising:

means for extracting, from facial image information of a plurality of different facial expressions of a predetermined human being, a plurality of one-dimensional facial expression components for each said facial expression corresponding to respective projective components for a plurality of coordinate axes on facial image representation space with the entire face taken as a processing unit, means for calculating a plurality of synthesized facial expression components corresponding to facial image information of a synthesized facial expression at an arbitrary rate for specified arbitrary two of said different facial expressions by interpolation/extrapolation of a facial expression component corresponding to said two different facial expressions, and generating synthesized facial image information according to said plurality of synthesized facial expression components.

11. The facial image information conversion apparatus according to claim 10, wherein said facial expression components and said synthesized facial expression components are expansion coefficients of corresponding facial image information expanded by Karhunen-Loève Transform.

12. The facial image information conversion apparatus according to claim 10, wherein said facial expression components and said synthesized facial expression components are expansion coefficients of corresponding facial image information expanded by discrete cosine transform.

13. A facial image information conversion apparatus comprising:

storage means for storing an average facial expression component difference between each facial expression provided by an average operation for a plurality of human beings according to facial expression components extracted from facial image information of a plurality of different facial expressions, means for deforming arbitrary applied facial image information so that a plurality of reference points establish a predetermined position relationship with the entire face taken as a processing unit, means for extracting a plurality of one-dimensional facial expression components corresponding to respective projective components for a plurality of coordinate axes on facial image representation space of said normalization facial image information, means for calculating a plurality of synthesized facial expression components corresponding to a specified facial expression representation rate from an average facial expression component difference between each facial expression and said facial expression component corresponding to said applied facial image information according to a facial expression of said applied facial image information and a specified facial expression, means for generating normalization synthesized facial image information according to said plurality of synthesized facial expression components, and deforming said normalization synthesized facial image information so that arrangement of reference points of said normalization synthesized facial image information is identical to the arrangement of reference points of original said applied facial image information.

14. The facial image information conversion apparatus according to claim 13, wherein said facial expression components and said synthesized facial expression components are expansion coefficients of corresponding facial image information expanded by Karhunen-Loève Transform.

15. The facial image information conversion apparatus according to claim 13, wherein said facial expression components and said synthesized facial expression components are expansion coefficients of corresponding facial image information expanded by discrete cosine transform.

* * * * *